United States Patent [19]

Valoppi et al.

[11] Patent Number: 5,210,103
[45] Date of Patent: May 11, 1993

[54] VOLATILE SILICONE OIL-BLOWN INTEGRAL SKIN FOAM

[75] Inventors: Valeri L. Valoppi, Riverview; Oscar M. Grace, Troy; Joe C. Wilson, Woodhaven, all of Mich.

[73] Assignee: BASF Corporation, Parsippany, N.J.

[21] Appl. No.: 939,753

[22] Filed: Sep. 2, 1992

[51] Int. Cl.$^5$ .............................................. C08J 9/34
[52] U.S. Cl. ................................. 521/51; 264/45.5; 521/110
[58] Field of Search ................. 521/51, 110; 264/45.5

[56] References Cited

U.S. PATENT DOCUMENTS 4,762,887  8/1988  Griswold et al. ............... 528/24
4,935,484  6/1990  Wolfgruber et al. ............ 528/34

*Primary Examiner*—Morton Foelak
*Attorney, Agent, or Firm*—Martin P. Connaughton

[57] ABSTRACT

The present invention relates to integral skin foams prepared without using halogenated hydrocarbons as blowing agents. The foams of the present invention are prepared using water and volatile silicone fluids as co-blowing agents. Useful silicone agents have boiling points at on below 100° C.

6 Claims, No Drawings

VOLATILE SILICONE OIL-BLOWN INTEGRAL SKIN FOAM

FIELD OF THE INVENTION

The present invention relates to polyurethane foams containing volatile silicone fluids as co-blowing agents and aids to skin formation. Specifically, these silicone fluids are used in conjunction with water as co-blowing agents to produce polyurethane foams. The use of silicone fluids as a blowing agent provides an environmentally desirable alternative to halogenated hydrocarbons and other volatile organic carbons such as pentane and heptane. The use of the volatile silicone fluids as a co-blowing agent is not limited to any particular polyurethane foam formulation, but it has been found to be particularly useful in integral skin polyurethane foam applications.

DETAILED DESCRIPTION OF THE INVENTION

Integral skin foams are well known to those skilled in the art of polyurethane foams. Such foams have a cellular interior and a higher density microcellular or non-cellular skin. In general, to prepare such foams, one reacts an organic isocyanate with a compound having at least one isocyanate reactive group, in the presence of a catalyst, blowing agent, and a variety of optional additives. The reaction is carried out in a mold where a higher density skin forms at the interface of the reaction mixture and the inner surface of the mold.

At the present time, the most common type of blowing agents used in integral skin polyurethane foams are chlorofluorocarbons (CFCs). However, industry today is faced with a mandate to reduce and eventually eliminate the use of CFCs.

Because the formation of the skin is influenced by physical elements such as mold temperature and pressure, not all types of blowing agents are suitable. As was stated previously, CFCs are preferred as a blowing agent. Although, water has been found to produce acceptable integral skin foams in some instances, U.S. Ser. No. 585,446, it is generally unacceptable as a sole blowing agent. U.S. Pat. Nos. 5,057,544 and 4,994,502 disclose the use of water with halogenated hydrocarbons in integral skin urethane foams.

Surprisingly, it has been found that volatile silicone fluids having a boiling point at or below about 100° C. may be used as a co-blowing agent with water to produce an integral skin polyurethane foam, therefore obviating the need for CFCs.

The foams of the present invention may be obtained by reacting
A) an organic isocyanate, with
B) a polyol selected from the group consisting of polyoxyalkylene polyether polyols, polyester polyols, graft polymer dispersions, non-graft polymer dispersions, and mixtures thereof in the presence of
C) a chain extender and/or crosslinker,
D) an effective amount of a catalyst and/or mixture of catalysts,
E) a co-blowing agent comprising water and a volatile silicone fluid, and,
F) optionally a surfactant, and/or other additive such as fillers and flame retardants.

Organic polyisocyanates useful in the present invention generally contain aromatically bound isocyanate groups. Representatives of the types of organic polyisocyanates contemplated herein are 1,4-diisocyanatobenzene, 1,3-diisocyanato-o-xylene, 1,3-diisocyanato-p-xylene, 1,3-diisocyanato-m-xylene, 2,4-diisocyanato-1-chloro-benzene, 2,4-diisocyanato-1-nitrobenzene, 2,5-diisocyanato-1-nitrobenzene, m-phylene diisocyanate, 2,4-toluene diisocyanate, 2,6-toluene diisocyanate, mixtures of 2,4-and 2,6-toluene diisocyanate, hexahydrotoluene diisocyanate, 1,5-naphthalene diisocyanate, 1-methoxy-2,4-phenylene diisocyanate, hexahydrotoluene diisocyanate, 1,5-naphthalene diisocyanate, 1-methoxy-2,4-phenylene diisocyanate, 4,4'-diphenylmethane diisocyanate, 4,4'-biphenylene diisocyanate, 3,3'-dimethyl-4,4'-diphenylmethane diisocyanate, 3,3'-4,4'-diphenylmethane diisocyanate and 3,3'-dimethyldiphenylmethane-4,4'-diisocyanate; the triisocyanates such as 4,4',4''-triphenylmethane triisocyanate, polymethylene polyphenylene polyisocyanate and 2,4,6-toluene triisocyanate; and the tetraisocyanates such as 4,4'-dimethyl-2,2'-5,5'-diphenylmethane tetraisocyanate. Especially useful due to their availability and properties are 2,4'-diphenylmethane diisocyanate, 4,4'-diphenylmethane diisocyanate, polymethylene polyphenylene polyisocyanate, and mixtures thereof.

These polyisocyanates are prepared by conventional methods known in the art such as the phosgenation of the corresponding organic amine. Preferred for use in the present invention are modifications of the above isocyanates which contain carbodiimide, allophonate, urethane or isocyanurate structures. Generally, these modified isocyanates will have an isocyanate content of from about 20 percent to about 40 percent by weight. Of the modified isocyanates, the urethane-modified type is preferred.

The urethane-modified isocyanates are prepared by reacting a suitable isocyanate with a hydroxy-terminated compound having a functionality greater than one, preferably having a functionality of two. Examples of these compounds include: ethylene glycol, propylene glycol, diethylene glycol, dipropylene glycol, glycol initiated polyoxyalkylene polymers and copolymers, and mixtures thereof. An example of such a urethane-modified diisocyanate is marketed by BASF under the trademark designation LUPRANATE TM MP-102. MP-102 is a pure MDI prepolymer with an isocyanate content of about 23 percent by weight.

Any suitable polyoxyalkylene polyether polyol may be used such as those resulting from the polymerization of a polyhydric alcohol and an alkylene oxide. Representatives of such alcohols may include ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, or 1,2,6-hexanetriol. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures, epihalohydrins such as epichlorohydrin, as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols and copolymer glycols prepared from blends or sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459.

Any suitable hydroxy-terminated polyester may be used such as are prepared form polycarboxylic acids and polyhydric alcohols. Any suitable polycarboxylic acid may be used such as oxalic acid, malonic acid succinic acid, glutaric acid, adipic acid, pimelic acid, suberic acid, azelaic acid, sebacic acid, brassylic acid, thapsic acid, maleic acid, fumaric acid, glutaconic acid, $\alpha$=hydromuconic acid, $\beta$-hydromuconic acid, $\alpha$-butyl-$\alpha$-ethyl-glutaric acid, $\alpha,\beta$-diethylsuccinic acid, isophthalic acid, terephthalic acid, hemimellitic acid, and 1,4-cyclohexane-dicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,5-pentanediol, 1,6-hexanediol, 1,7-heptanediol, glycerol, 1,1,1-trimethylolpropane, 1,1,1-trimethylolethane, 1,2,6-hexanetriol, $\alpha$-methyl glucoside, pentaerythritol, and sorbitol. Also included within the term "polyhydric alcohol" are compounds derived from phenol such as 2,2-bis(4-hydroxyphenyl)propane, commonly known as bisphenol A.

Other polyesters which may be employed are the mixed polyesters derived from the "bottoms" obtained by the transesterification of the dimethylterephthalate esters with diethylene glycol. One common designation is TERATE 203. Other polyesters which may be employed are the mixed polyester polyols derived from polyethylene terephthalate. Such polyesters are designated as Chardol 574, 570, and 740. These polyesters may have hydroxyl numbers from about 300 to about 800.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-containing polyester with only a portion of the components being a diamine such as ethylene diamine.

Other polyoxyalkylene polyether polyols employed are those which contain grafted therein vinylic monomers.

The polyols which have incorporated therein the vinylic polymers may be prepared (1) by the in situ free-radical polymerization of an ethylenically unsaturated monomer or mixture of monomers in a polyol; or (2) by dispersion in a polyol of a preformed graft polymer prepared by free-radical polymerization in a solvent such as described in U.S. Pat. Nos. 3,931,092, 4,014,846, 4,093,573, and 4,122,056, the disclosures of which are herein incorporated by reference; or (3) by low temperature polymerization in the presence of chain transfer agents. These polymerizations may be carried out at a temperature between 65° C. and 170° C., preferably between 75° C. and 135° C.

The amount of ethylenically unsaturated monomer employed in the polymerization reaction is generally from one (1) percent to 60 percent, preferably from 10 percent to 40 percent, based on the total weight of the product. The polymerization occurs at a temperature between about 80° C. and 170° C. preferably from 75° C. to 135° C.

The polyols which may be employed in the preparation of the graft polymer dispersions are well known in the art. Both conventional polyols essentially free from ethylenic unsaturation, such as those described in U.S. Pat. No. Re. 28,715, and unsaturated polyols, such as those described in U.S. Pat. Nos. 3,652,659 and U.S. Pat. No. Re. 29,014 may be employed in preparing the graft polymer dispersions used in the instant invention, the disclosures of which are incorporated by reference. Representative polyols essentially free from ethylenic unsaturation which may be employed are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,459, 3,190,927, and 3,346,557, the disclosures of which are incorporated by reference.

The unsaturated polyols which may be employed for preparation of graft copolymer dispersions may be prepared by the reaction of any conventional polyol such as those described above with an organic compound having both ethylenic unsaturation and a hydroxyl, carboxyl, anhydride, isocyanate, or epoxy group; or they may be prepared by employing an organic compound having both ethylenic unsaturation and a hydroxyl, carboxyl, anhydride, or epoxy group as a reactant in the preparation of the conventional polyol. Representative of such organic compounds include unsaturated mono- and polycarboxylic acids and anhydrides such as maleic acid and anhydride, fumaric acid, crotonic acid and anhydride, propenyl succinic anhydride, halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene monoxide, butadiene monoxide, vinyl glycidyl ether, glycidyl methacrylate and 3-allyloxypropylene oxide.

As mentioned above, the graft polymer dispersions used in the invention are prepared by the in situ polymerization of an ethylenically unsaturated monomer or a mixture of ethylenically unsaturated monomers, either in a solvent or in the above-described polyols. Representative ethylenically unsaturated monomers which may be employed in the present invention include butadiene, isoprene, 1,4-pentadiene, 1,5-hexadiene, 1,7-octadiene, styrene, $\alpha$-methylstyrene, methylstyrene, 2,4-dimethylstyrene, ethystyrene, isopropylstyrene, butylstyrene, phenylstyrene, cyclohexylstyrene, benzylstyrene, and the like; substituted styrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene,methyl-4-vinylbenzoate,phenoxystyrene,p-vinyldiphenylsulfide,p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetum, inoacrylate, butyl acrylate, 2-ethylhexyl acrylate, phenyl acrylate, phenyl methacrylate, α-chloroacrylonitrile, methacrylonitrile, N,N-dimethylacrylamide, N,N-dibenzylacrylamide, N-butylacrylamide, methacryl formamide, and the like; the vinyl esters, vinyl ethers, vinyl ketones, etc., such as vinyl acetate, vinyl chloroacetate, vinyl alcohol, vinyl butyrate, isopropenyl acetate, vinyl formate, vinyl acrylate, vinyl methacrylate, vinyl methoxyacetate, vinyl benzoate, vinyl iodide, vinyl toluene, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ether, vinyl butyl ether, vinyl 2-ethylhexyl ether, vinyl phenyl ether, vinyl 2-butoxyethyl ether, 2,4-dihydro-1,2-pyran, 2-butoxy-2'-vinyloxy diethyl ether, vinyl 2-ethylthioethyl ether, vinyl methyl ketone, vinyl ethyl ketone, vinyl phenyl ketone, vinyl phosphonates such as bis(b-chloroethyl)vinyl phosphonate, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinylsulfonate, methyl vinylsulfonate, N-vinyl pyrrole, and the like; dimethyl fumarate, dimethyl maleate, maleic acid, crotonic acid, fumaric acid, itaconic acid, monomethyl itaconate, butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used, and the compounds listed above are illustrative and not restrictive of the monomers suitable for us in this invention. Preferably, the monomer is selected from the group consisting of acrylonitrile, styrene, methyl methacrylate and mixtures thereof.

Illustrative initiators which may be employed for the polymerization of vinyl monomers are the well-known free radical types of vinyl polymerization initiators, for example, the peroxides, persulfates, perborates, percarbonates, azo compounds, etc., including hydrogen peroxide dibenzoyl peroxide, acetyl peroxide, benzoyl hydroperoxide, t-butyl hydroperoxide, di-t-butyl peroxide, lauryl peroxide, butyl peroxide, diisopropylbenzene hydroperoxide, cumeme hydroperoxide, paramenthane hydroperoxide, di-α-cumyl peroxide, dipropyl peroxide, diisopropyl peroxide, difuryl peroxide, ditriphenylmethyl peroxide, bis(p-methyoxybenzoyl)peroxide, p-monoethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, transdecalin hydroperoxide, α-methyl-benzyl hydroperoxide, α-methyl-α-ethyl benzyl hydroperoxide, tetralin hydroperoxide, triphenylmethyl hydroperoxide, diphenylmethyl hydroperoxide, α,α'-azo-bis(2-methyl)butyronitrile, α,α'-azo-bis(2-methyl)heptonitrile, 1,1-azo-bis(1-cyclohexane)carbonitrile, dimethyl α,α'-azobis(isobutyronitrile), 4,4'-azobis(4-dyanopetanoic)acid, azo-bis(isobutyronitrile), 1-t-amylazo-1-cyanocyclohexane, 2-t-butylazo-2-cyano-4-methoxy-4-methylpentane, 2-t-butylazo-2-cyano-4-methylpentane, 2-(t-butylazo)isobutyronitrile, 2-t-butylazo-2-cyanobutane, 1-cyano-1-(t-butylazo)cyclohexane, t-butyl peroxy-2-ethylhexanoate, t-butylperpivalate, 2,5-dimethylhexane-2,5-diper-2-ethyl hexoate, t-butylperneo-decanoate, t-butylperbenzoate, t-butyl percrotonate, persuccinic acid, diisopropyl peroxydicarbonate, and the like; a mixture of initiators may also be used. Photochemically sensitive radical generators may also be employed. Generally from about 0.5 percent to about 10 percent, preferably from about one (1) percent to about four (4) percent, by weight of initiator based on the weight of the monomer will be employed in the final polymerization.

Non-graft polymer dispersions are also preferred, for example, those prepared by the reaction of a polyisocyanate with an alkanolamine in the presence of a polyol as taught by U.S. Pat. Nos. 4,293,470; 4,296,213; and 4,374,209; dispersion of polyisocyanurates containing pendant urea groups as taught by U.S. Pat. No. 4,386,167; and polyisocyanurate dispersions also containing biuret linkages as taught by U.S. Pat. No. 4,359,541.

Stabilizers may be employed during the process of making the graft polymer dispersions. One such example is the stabilizer disclosed in U.S. Pat. No. 4,148,840, which comprises a copolymer having a first portion composed of an ethylenically unsaturated monomer or mixture of such monomers and a second portion which is a propylene oxide polymer. Other stabilizers which may be employed are the alkylene oxide adducts of copolymers of styrene-allyl alcohol. The preferred polyols are mixtures of polyoxyalkylene polyethers and graft polymer dispersions.

Any suitable catalyst may be used including tertiary amines such as triethylenediamine, N-methylmorpholine, N-ethylmorpholine, diethylethanolamine, N-cocomorpholine, 1-methyl-4-dimethylaminoethylpiperazine, methoxypropyldimethylamine, N,N,N'-trimethylisopropyl propylenediamine, 3-diethylaminopropyldiethylamine, dimethylbenzylamine, and the like. Examples of such commercially available catalysts are the DABCO ® series available through Air Products Corp. Other suitable catalysts are dibutyltin dilaurate, dibutyltin diacetate, stannous chloride, dibutyltin di-2-ethyl hexanoate, stannous oxide, as well as other organometallic compounds, such as those disclosed in U.S. Pat. No. 2,846,408.

Chain extending agents and/or crosslinking agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes ethylene glycol, glycerine trimethylolpropane, propylene glycol, 1,4-butanediol and primary and secondary diamines such as phenylenediamine, 2,5-cyclohexane-bis-(methylamine), ethylenediamine, diethylenetriamine, N-(2-hydroxypropyl)ethylenediamine, N,N'-di(2-hydroxypropyl)ethylenediamine, piperazine, 2-methylpiperazine, 2,3-, 2,6-, 3,4-, 2,5-, 2,4-toluenediamine, 2,4'- and 4,4'-diphenylmethanediamine. Of the above-mentioned compounds, butanediol and ethylene glycol are the preferred chain-extending agents.

The co-blowing agent used in the present invention consists of water and a volatile silicone fluid. The silicone fluids useful in the present invention are those with a boiling point at or below 100° C. An example of a preferred volatile silicone is hexamethyldisiloxane silicone fluid available from Dow under the registered trademark 200 ® Fluid 0.65 cs. The hexamethyldisiloxane from Dow Corning has a boiling point at 760 mm of 100° C. and an average kinematic viscosity of 0.65 centistokes. The water and volatile silicone fluid are present in amounts sufficient to cause the formulation to foam. Generally, the water is present in amounts of from 0.1 weight percent to about 0.4 weight percent and the volatile silicone present in amounts of from 2 weight percent to about 12.5 weight percent, based on the total weight of the resin component.

Although a surface active agent is usually necessary for the production of high grade polyurethane foam, such is not generally the case in the present invention. The silicone fluids used as blowing agents in most cases obviate the need for addition of further surfactants. However, if desired, a surface active agent may be added. Of those known in the art, nonionic surface active agents are preferred, such as the well-known silicones.

It is within the spirit of the invention and the scope of knowledge of those skilled in the art to employ pigments such as carbon black, fillers, and flame retardants. Among the flame retardants which may be employed are pentabromodiphenyl oxide, dibromopropanol, tris($\beta$-chloropropyl)phosphate, 2,2'-bis(bromoethyl)1,3-propanediol, tetraki(2-chloroethyl) ethylene diphosphate, tris(2,3-dibromopropyl)phosphate, tris($\beta$-chloroethyl)phosphate, tris(1,2-dichloropropyl)phosphate, bis-(2-chloro-ethyl)-2-chloroethylphosphonate, molybdenum trioxide, ammonium molybdate, ammonium phosphate, pentabromodiphenyloxide, tricresyl phosphate, hexabromocyclododecane, and dibromoethyldibromocyclohexane, melamine, and various forms of graphite.

The following examples serve only to illustrate and are not limiting in nature:

Polyol A is a propylene glycol initiated polyoxypropylene-polyoxyethylene block copolymer having a nominal hydroxyl number of 25. The polyoxyethylene is present in the copolymer as a 20 weight percent cap. It is commercially available from BASF Corporation under the designation of PLURACOL ® polyol 628.

Polyol B is a glycerine initiated polyoxypropylene-polyoxyethylene copolymer having a nominal hydroxyl number of 27. The polyoxyethylene is present in the copolymer as a 20 weight percent cap. It is commercially available from BASF Corporation under the designation of PLURACOL ® polyol 1026.

Polyol C is a glycerine initiated polyoxypropylene-polyoxyethylene copolymer having a nominal hydroxyl number of 35. The polyoxyethylene is present as a 16 weight percent cap. It is commercially available from BASF Corporation under the designation of PLURACOL ® polyol 816.

Polyol D is a 31 weight percent solids, 1:1 acrylonitrile-styrene copolymer dispersion. It is dispersed in a trimethylolpropane initiated polyoxypropylene-polyoxyethylene capped block copolymer. It is commercially available from BASF Corporation under the designation PLURACOL ® polyol 973.

Polyol E is a 31 weight percent solids, 1:1 acrylonitrile-styrene copolymer dispersion. It is dispersed in a trimethylolpropane initiated polyoxypropylene-polyoxyethylene capped copolymer. It is commercially available from BASF Corporation under the designation PLURACOL ® polyol 1198.

BDO-1,4 is 1,4-butanediol.

EG is ethylene glycol.

XFE-1028 is an amine catalyst in butanediol, commercially available from Air Products Corp.

T-12 is dibutyltin dilaurate, commercially available from Air Products Corp.

F-11 is monofluorotrichloromethane commercially available from DuPont.

DC-200 ® is a volatile silicone fluid having a primary component of hexamethyldisiloxane, commercially available from Dow Corning Corp. under the designation 200 ® Fluid 0.65 cs.

Isocyanate A is a urethane-modified 4,4'-diphenylmethane diisocyanate having about 23 percent free NCO, commercially available from BASF Corporation under the designation LUPRANATE ™ MP102.

Isocyanate B is a proprietary blend of a urethane-modified 4,4'-diphenylmethane diisocyanate-polymeric diphenylmethane diisocyanate having about 24 percent free NCO.

The foam preparation used for Examples 1–6 in Table I and 7–14 in Table II was a hand mix procedure. The foams of the present invention are equally amenable to other preparation techniques known to those skilled in the art, such as the RIM process.

The indicated amounts of the resin components were added to a suitable mixing container. A calculated amount of an isocyanate was then added. The resin and isocyanate were mixed for about five (5) seconds with a propeller or "Jiffy" mixer at nominally 3,000 rpm. The resin/isocyanate mix was poured into a clean, dry, preheated (45°–50° C.) plaque mold (12"×6"×1"). The mold was closed and clamped. The foam was allowed to rise and cure. It was subsequently removed and allowed to age for at least seven (7) days prior to physical testing.

TABLE I

| EXAMPLES | 1 | 2 | 3 | 4 | 5 | 6 |
|---|---|---|---|---|---|---|
| POLYOL A | — | — | — | — | — | — |
| POLYOL B | — | — | — | — | — | — |
| POLYOL C | 135.1 | 129.5 | 135.3 | 137.0 | 131.8 | 137.5 |
| POLYOL D | — | — | — | — | — | — |
| POLYOL E | 36.64 | 35.14 | 36.7 | 37.16 | 35.74 | 37.3 |
| BDD-1,4 | 9.16 | 8.79 | 9.18 | 9.29 | 8.94 | 9.33 |
| XFE-1028 | 2.29 | 2.2 | 2.29 | 2.32 | 2.23 | 2.33 |
| T-12 | 0.045 | 0.045 | 0.045 | 0.045 | 0.045 | 0.045 |
| F-11 | 11.0 | — | — | 11.2 | — | — |
| DC-200 | — | 14.0 | — | — | 14.2 | — |
| WATER | 0.29 | 0.6 | 0.79 | 0.29 | 0.61 | 0.8 |
| ISOCYANATE A | 68.39 | 72.17 | 78.67 | — | — | — |
| ISOCYANATE B | — | — | — | 65.57 | 69.45 | 75.62 |
| PHYSICAL PROPERTIES | | | | | | |
| DENSITY (pcf) | 30.9 | 27.72 | 26.09 | 28.79 | 30.51 | 29.4 |
| TENSILE STRENGTH (psi) | 143.3 | 153.3 | 143.3 | 110.0 | 123.3 | 90.0 |
| ELONGATION % | 178.2 | 162.2 | 135.4 | 150.2 | 131.4 | 107.2 |
| SPLIT TEAR (pi) | 14.9 | 15.8 | 9.7 | 11.5 | 11.3 | 8.7 |
| GRAVES TEAR (pi) | 36.9 | 34.3 | 27.5 | 34.3 | 33.7 | 26.7 |
| SHORE A HARDNESS | 43 | 36 | 26 | 38 | 37 | 33 |
| 5 SECONDS | 40 | 30 | 23 | 36 | 35 | 31 |
| TABER ABRASION (mg lost/18 whls) | 195.3 | 151.2 | 351.6 | 184.5 | 105.7 | 178.9 |
| ROSS FLEX K CYCLES TO 100K | 8.8 | 3 | 3 | 0 | 49.4 | 57 |
| % CRACK @ FAIL | 0 | 0 | 0 | 400 | 0 | 0 |

TABLE II

| EXAMPLES | 7 | 8 | 9 | 10 | 11 | 12 | 13 | 14 |
|---|---|---|---|---|---|---|---|---|
| POLYOL A | 124.25 | 124.25 | 124.25 | 124.25 | 124.25 | 124.25 | 124.25 | 124.25 |
| POLYOL B | 14.49 | 14.49 | 14.49 | 14.49 | 14.49 | 14.49 | 14.49 | 14.49 |

TABLE II-continued

| EXAMPLES | 7 | 8 | 9 | 10 | 11 | 12 | 13 | 14 |
|---|---|---|---|---|---|---|---|---|
| POLYOL C | — | — | — | — | — | — | — | — |
| POLYOL D | 41.42 | 41.42 | 41.4 | 41.4 | 41.4 | 41.4 | 41.4 | 41.4 |
| POLYOL E | — | — | — | — | — | — | — | — |
| BDD-1,4 | 12.4 | 12.4 | 12.4 | 12.4 | 12.4 | 12.4 | 12.4 | 12.4 |
| EG | 0.4 | 0.4 | 0.4 | 0.4 | 0.4 | 0.4 | 0.4 | 0.4 |
| XFE-1028 | 2.5 | 2.5 | 2.5 | 2.5 | 2.5 | 2.5 | 2.5 | 2.5 |
| T-12 | 0.1 | 0.1 | 0.1 | 0.1 | 0.1 | 0.1 | 0.1 | 0.1 |
| F-11 | — | — | — | — | — | — | — | — |
| DC-200 | 25.0 | 20.0 | 15.0 | 10.0 | 20.0 | 15.0 | 10.0 | 5.0 |
| WATER | 0.4 | 0.4 | 0.4 | 0.4 | 0.6 | 0.6 | 0.6 | 0.6 |
| ISOCYANATE A | 83.5 | 83.5 | 83.5 | 83.5 | 87.9 | 83.5 | 83.5 | 83.5 |
| PHYSICAL PROPERTIES | | | | | | | | |
| DENSITY (pcf) | 39.9 | 38.6 | 37.6 | 36.4 | 33.0 | 32.4 | 30.6 | 30.4 |
| TENSILE STRENGTH (psi) | 383 | 410 | 280 | 479 | 291 | 293 | 293 | 377 |
| ELONGATION % | 263 | 310 | 213 | 393 | 253 | 246 | 210 | 270 |
| SPLIT TEAR (pi) | 95 | 78 | 70 | 71 | 57 | 58 | 45 | 42 |
| GRAVES TEAR (pi) | 146 | 144 | 133 | 126 | 113 | 119 | 86 | 93 |
| SHORE A HARDNESS | 66 | 66 | 61 | 62 | 61 | 58 | 57 | 54 |
| 5 SECONDS | 62 | 62 | 57 | 57 | 56 | 54 | 53 | 50 |
| TABER ABRASION (mg lost/18 whls) | 169.7 | 89.3 | 66.3 | 112.5 | 98.8 | 78.9 | 72.1 | 46.3 |
| ROSS FLEX K CYCLES TO FAIL | 101 | 130 | 112 | 84 | 75 | 76 | 4.6 | 5.8 |
| % CRACK 100K CYCLES | 0 | 0 | 0 | 0 | 0 | 0 | 0 | 0 |

Table I illustrates that an integral skin foam having acceptable physical properties may be produced using a co-blowing agent consisting of water and a volatile silicone fluid (Examples 2 and 5). Examples 1 and 4 are comparative examples using a co-blowing agent consisting of a halogenated hydrocarbon and water. Examples 3 and 6 are examples of completely water-blown systems. Table II provides examples illustrating the effectiveness of volatile silicone fluids at various levels in a typical integral skin shoe sole system.

The embodiments of the present invention in which an exclusive property or privilege is claimed are defined as follows:

We claim:

1. An integral skin polyurethane foam, comprising:
   A) an organic isocyanate; and,
   B) a resin component, comprising:
      i) a polyol selected from the group consisting of polyoxyalkylene polyether polyols, polyester polyols, graft copolymer dispersions, non-graft polymer dispersions, and mixtures thereof;
      ii) a chain extender and/or crosslinker;
      iii) a catalyst and/or mixture of catalysts capable of promoting urethane formation and optionally isocyanurate formation;
      iv) a co-blowing agent comprising water and a volatile silicone fluid having a boiling point at 760 mm of 100° C. and an average kinematic viscosity of 0.65 centistokes; and,
      v) optionally a surfactant, fillers, flame retardants, and mixtures thereof.

2. A polyurethane foam as claimed in claim 1, wherein the organic isocyanate is a urethane-modified diphenylmethane diisocyanate.

3. A polyurethane foam as claimed in claim 1, wherein the polyol is a mixture of polyoxyalkylene polyether polyols and a graft copolymer dispersion.

4. A polyurethane foam as claimed in claim 1, wherein the chain extender is a mixture of 1,4-butanediol and ethylene glycol.

5. A polyurethane foam as claimed in claim 1, wherein the volatile silicone fluid is hexamethyldisiloxane having a boiling point of 760 mm of 100° C. and an average kinematic viscosity of 0.65 centistokes.

6. A polyurethane foam as claimed in claim 1, wherein the co-blowing agent consists of water present in amounts of from 0.1 weight percent to about 0.4 weight percent and a volatile silicone fluid present in amounts of from about 12.5 weight percent to about 2.0 weight percent based on the total weight of the resin component.

* * * * *